United States Patent
Benson et al.

(10) Patent No.: US 6,969,534 B2
(45) Date of Patent: Nov. 29, 2005

(54) PROCESS OF PREPARING FROZEN FRENCH FRIED POTATO PRODUCT

(75) Inventors: Dwane B. Benson, Payette, ID (US); Susan Farnsworth, Fruitland, ID (US); Joseph DeStephano, Pittsburgh, PA (US)

(73) Assignee: H. J. Heinz Company, Pittsburgh, PA (US)

( * ) Notice: Subject to any disclaimer, the term of this patent is extended or adjusted under 35 U.S.C. 154(b) by 193 days.

(21) Appl. No.: 10/098,348

(22) Filed: Mar. 18, 2002

(65) Prior Publication Data

US 2002/0160084 A1 Oct. 31, 2002

Related U.S. Application Data

(60) Provisional application No. 60/283,164, filed on Apr. 12, 2001.

(51) Int. Cl.[7] ................................................ A23L 1/217
(52) U.S. Cl. ....................... 426/102; 426/293; 426/295; 426/438; 426/441; 426/637
(58) Field of Search ................................ 426/102, 293, 426/295, 438, 441, 637

(56) References Cited

U.S. PATENT DOCUMENTS

| | | |
|---|---|---|
| 3,424,591 A | 1/1969 | Gold |
| RE27,531 E | 12/1972 | Murray et al. |
| 3,751,268 A | 8/1973 | Van Patten et al. |
| 3,949,094 A * | 4/1976 | Johnson et al. ................ 426/99 |
| 4,238,517 A * | 12/1980 | Bosley et al. ............ 426/637 X |
| 4,293,582 A * | 10/1981 | Hamann et al. ............. 426/637 |
| 4,317,842 A | 3/1982 | El-Hag et al. |
| 5,372,830 A | 12/1994 | Muller |
| 5,484,617 A | 1/1996 | Tiffany |

* cited by examiner

*Primary Examiner*—Arthur Corbin
(74) *Attorney, Agent, or Firm*—Burns, Doane, Swecker & Mathis LLP

(57) ABSTRACT

A frozen French fried potato product possessing unique taste characteristics is manufactured by producing potato pieces having a desired shape, frying the potato pieces, freezing the potato pieces, and applying a topical addition to the frozen potato pieces. The topical addition is preferably an encapsulated topical addition in which a water soluble ingredient other than salt is encapsulated in an encapsulation material. To impart sweet taste characteristics to the frozen French fried potato product, the topical addition is an encapsulated sugar. The resulting frozen French fried potato product is constituted by potato pieces that have been fried and frozen, with the topical addition such as encapsulated sugar applied to the outer surface of the frozen French fried potato pieces.

14 Claims, 2 Drawing Sheets

PROCESS OF PREPARING FROZEN FRENCH FRIED POTATO PRODUCT

This application is based on and claims priority under 35 U.S.C. §119(e) with respect to U.S. Provisional Patent Application No. 60/283,164 filed on Apr. 12, 2001, the entire content of which is incorporated herein by reference.

FIELD OF THE INVENTION

The present invention generally relates to potato products and methods for producing such products. More particularly, the present invention pertains to frozen French fried potato products provided with topical additions such as sugar (encapsulated sugar), and methods for producing such frozen French fried potato products.

BACKGROUND OF THE INVENTION

French fried potato products have long been popular as a food item. French fried potato products which have been frozen and can be relatively easily reheated or reconstituted by the consumer in an oven, toaster oven, microwave oven or deep fat frying are particularly popular. Various methods and techniques have been proposed and utilized for preparing such products so that they have a desirable French fried appearance and pleasing textural qualities.

One type of known frozen French fried potato product is a formed potato product. In this type of product, potato pieces are cooked and then appropriately processed into a potato mash or mixture. The potato mash or mixture is mixed with other ingredients such as binders and salt, and the resulting mixture is then formed into the desired potato product through use of an extruder. The formed potato product is then fried, frozen and packaged.

Another form of French fried potato product involves the use of raw potatoes that are at least partially cooked by blanching and/or steaming, and then fried, frozen and packaged. With these types of potatoes, it is known in the industry to apply a batter coating that coats the outer surface of the potato pieces. After the batter coating is applied, the potato pieces are subjected to final frying, followed by freezing and packaging as mentioned above. The batter coating is applied for purposes of improving certain characteristics of the potato product. In particular, with the applied batter coating, the potato product is better able to maintain its crispness characteristics, upon reheating or reconstituting by the consumer, for a longer period of time than would otherwise be the case.

U.S. Pat. No. 5,484,617 describes a process for preparing golden yellow potato products that involves passing the potato pieces through an aqueous solution containing annatto. The patent describes preparing raw potato pieces in a conventional manner for partial cooking in a water bath or steam chamber. The potato pieces are then passed through an aqueous solution containing annatto so that the potato pieces emerging from the aqueous solution have a light golden yellow color. As the potato pieces are passed through the aqueous solution containing annatto, the solution is readily absorbed by the gelatinized surfaces of the potato pieces. The potato pieces are then cooked and frozen for packaging and sale. The consumer can then reheat or reconstitute the potato pieces for consumption through use of an oven or by deep frying.

U.S. Pat. No. Re 27,531 discloses a process for treating potato products from reconstituted raw potatoes or sliced raw potatoes. The potato pieces are dipped in an amylose coating, followed by cooking in hot edible cooking oil. The amylose coating is intended to produce a product having improved appearance, texture and taste when used to coat potato products prior to deep frying.

U.S. Pat. No. 3,751,268 discloses a method of coating potato pieces with ungelatinized, unmodified, high amylose starch prior to being cooked in edible frying oil. By coating the potato products with ungelatinized, unmodified, high amylose starch prior to deep fat frying, the oil absorption during deep fat frying is reduced and the resulting product is said to have an improved textural quality.

U.S. Pat. No. 3,424,591 discloses a method of surface treating potato pieces with a synthetic or chemically modified natural hydrocolloid prior to deep fat frying to produce French fried potato products having a lighter, more even color, a firmer texture, a higher residual moisture content, and a reduced oil content. The patent describes dipping partially cooked potato pieces in non-ionic alkylcellulose ether, such as hydroxypropylmethyl cellulose, or carboxymethyl-cellulose, generally designated as an aqueous hydrocolloid solution. This coating is said to inhibit natural browning, with the primary purpose of the disclosed hydrocolloid being to form a viscous coating preventing penetration of oil during the subsequent cooking period.

It is also known in the industry to apply salt to frozen French fried potato products for imparting salty taste characteristics to the frozen French fried potato product.

As evidenced by at least some of these patents, there is an interest in the industry to provide consumers with frozen French fried potato products having preferred color characteristics and textural characteristics. However, no attention has been given to providing frozen French fired potato products with unique taste qualities. More particularly, no attention has been given to providing frozen French fried potato products with topical additions, such as sugar or other sweet flavored coatings, that result in a frozen French fried potato product significantly different from known frozen French fried potato products. There thus exists an interest and need in the marketplace, particularly amongst younger consumers, for frozen French fried potato products that are uniquely appealing, for example from the standpoint of taste and possibly visual appearance, and different from anything commercially available.

SUMMARY OF THE INVENTION

According to one aspect, a method for preparing a frozen French fried potato product involves producing potato pieces having a desired shape from potatoes, frying the potato pieces, freezing the potato pieces, and applying an encapsulated sugar to the frozen potato pieces, with the encapsulated sugar including sugar encapsulated in an encapsulation material.

According to another aspect, a method for preparing a potato product involves producing potato pieces having a desired shape from potatoes, frying the potato pieces, freezing the potato pieces, and applying an encapsulated topical addition to the frozen potato pieces, with the encapsulated topical addition comprising a water soluble ingredient other than salt encapsulated in an encapsulation material.

In accordance with an additional aspect, a frozen French fried potato product includes frozen French fried potato pieces which have been fried and frozen, and an encapsulated sugar applied to the outer surface of the frozen French fried potato pieces to impart sweet taste characteristics to the frozen French fried potato product. The encapsulated sugar includes sugar encapsulated in an encapsulation material.

According to another aspect, a frozen French fried potato product includes frozen French fried potato pieces which have been fried and frozen, and an encapsulated topical addition applied to the outer surface of the frozen French fried potato pieces, with the encapsulated topical addition sugar including a water soluble ingredient other than salt encapsulated in an encapsulation material.

A further aspect involves a method for preparing a frozen French fried potato product that involves producing potato pieces having a desired shape from potatoes, frying the potato pieces, freezing the potato pieces, applying a sugar coating to the outside surface of the frozen potato pieces to impart sweet taste characteristics to the French fried potato product upon consumption, and packaging the sugar coated frozen potato pieces.

BRIEF DESCRIPTION OF THE DRAWING FIGURES

The foregoing and additional features and characteristics of the present invention will become more apparent from the following detailed description considered with reference to the accompanying drawing figures.

DETAILED DESCRIPTION OF THE INVENTION

Generally speaking, the present invention provides a potato product, particularly a frozen French fried potato product, having unique and appealing taste characteristics. The unique taste characteristics are preferably imparted to the potato product by applying a topical coating of an encapsulated water soluble ingredient (e.g., sugar) to the potato product. According to one aspect, the potato product is produced by at least partially cooking potato pieces, producing a potato mash from the at least partially cooked potato pieces, adding ingredients to the potato mash, forming the resulting potato mixture into potato pieces having the desired form, and then frying and freezing the French fried potato product. The topical additions are applied to the frozen French fried potato product, with the resulting product then being packaged.

Alternatively, potato pieces (e.g., whole potatoes or potatoes which have been cut into smaller parts) are at least partially cooked, fried and frozen. If desired, the potato pieces can be immersed in a batter solution prior to being fried. The topical additions are once again applied to the frozen French fried potato product, and the resulting product is then packaged.

Except for the specific details described below that are employed to impart the unique taste characteristics to the formed frozen French fried potato product, the process used here to produce the formed frozen French fried potato product is similar to processes known in the industry for producing formed French fried potato products. U.S. Pat. No. 4,082,855 issued to Citti et al. on Apr. 4, 1978, the disclosure of which is incorporated herein by reference, describes such a known process for producing a formed potato product.

Figure 1:
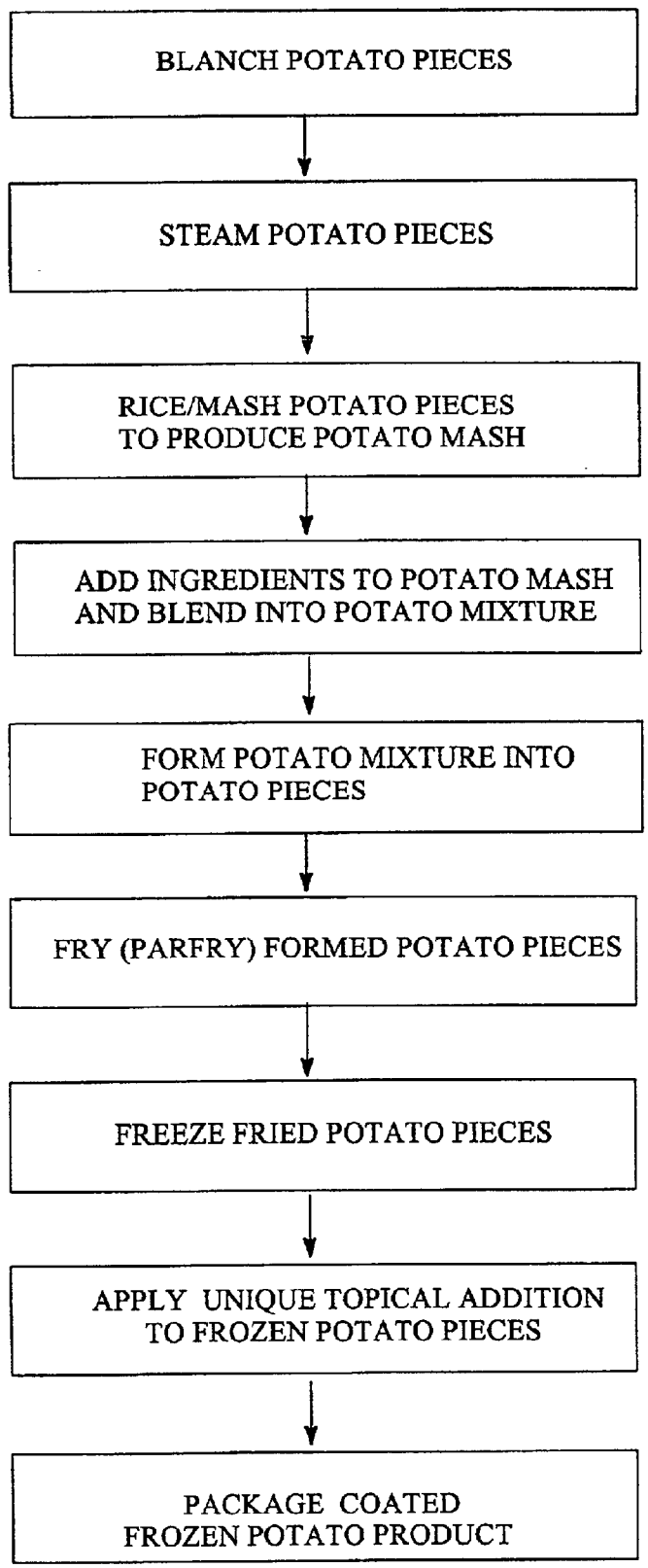
FIG. 1 is a process flow diagram illustrating one process in accordance with the present invention for producing frozen French fried potato products having unique topical additions.

FIG. 1 generally illustrates the process employed here to produce formed frozen French fried potato products. The process begins with the use of potato parts or pieces. The potato pieces can be whole potatoes, cut-up potatoes or Offal resulting from French fried potato production. The potato pieces or parts are blanched in water for an appropriate amount of time to inactivate enzymatic activity and soften the potato structure. By way of example, the potato pieces can be blanched for 5–14 minutes at 160° F. to 19020 F.

The blanched potato pieces can then be steamed thoroughly for an appropriate time at an appropriate temperature. In this way, the potato pieces are generally completely softened for purposes of preparing them for subsequent steps in which the potato pieces are formed into a potato mash. By way of example, the blanched potato pieces can be steamed at 212° F. for a period of 12–30 minutes. This steaming also creates a favorable granular-type structure commonly referred to as mealiness in baked potatoes.

Following the steaming, the potato pieces or parts are riced, mashed or otherwise suitably processed using commercially available and currently used equipment to transform the cooked potato pieces into a relatively smooth uniform potato mash. Once the potato mash is produced, ingredients such as those typically used are added to the mash. The ingredients include typical ingredients used to produce formed potato products such as known binders (e.g., potato flakes and xanthan gum), salt and other ingredients. Other possible binders that could be used include starches, methylcellulose, other gums and other hydrocolloids. Other possible ingredients that could be added include dextrose, SAPP (sodium acid pyrophosphate) and processing aids such as monoglycerides and diglycerides. These various ingredients, which are typically in dry form, are mixed together with the potato mash in a mixer in a manner known in the industry.

After the ingredients have been mixed or blended, the resulting potato mixture is formed into French fried potato products by extruding the mixture through extrusion equipment, such as that described in U.S. Pat. No. 4,082, 855. Generally speaking, any currently commercially available, food grade extrusion equipment can be used to extrude the mixture through an extrusion head and die to form an elongated potato product (e.g., an elongated potato product with ridges such as a crinkle cut potato product) such as those used to extrude licorice, pasta, and the like. The potato mixture can also be formed into the desired form using other types of equipment. Also, the potato mixture can be shaped into formed potato products having a shape other than an elongated shape. Other shapes include, but are not limited to, alphanumeric characters or symbols of any alphabet, animals, children story characters, including currently-popular characters such as POKEMON® branded characters, dancing bears, etc. Formed potato products having these or other shapes represent a unique consumer product having potentially great appeal to different segments of consumers, particularly consumers that may not have had a significant interest in frozen French fried potato products until now.

Once the potato products have been formed into the desired shape or configuration, the formed potato products are then parfried. The formed potato products can be parfried at a temperature and for a duration similar to that typically employed for parfrying formed potato products. By way of example, the potato pieces are parfried in food grade oil at about 270° F.–395° F., preferably at about 330° F.–395° F., and more preferably at 345° F.–395° F. for a period of 30–180 seconds. Following parfrying, the potato pieces are frozen.

After the potato pieces are frozen in the conventional manner, the topical addition or coating is applied to the frozen potato product. In one preferred form of the invention, the topical addition or coating is sugar (sucrose). This topical sugar coating imparts unique and appealing taste characteristics to the French fried potato product.

It may be possible in certain instances to apply a topical sugar coating to the frozen potato product. It has been found, however, that even though the potato pieces are frozen, there still exists some available water on the frozen potato pieces. In addition, moisture is present from the humidity/ice crystals typically found in a frozen food environment. If sugar is applied to the frozen French fried potato product, this water or moisture may tend to dissolve the sugar. Thus, the resulting product may not possess the desired appearance or degree of sweet taste.

Thus, developmental efforts have led to the discovery that an encapsulated sugar coating can be applied to the frozen product. There are encapsulated salt products on the market used, for example, in connection with meat. Companies such as BalChem and Primera Foods produce encapsulated salts for such usages. Techniques similar to those used to produce this known encapsulated salt can be used here to produce encapsulated sugar.

The encapsulated sugar is comprised of an encapsulation material in the form of oil or fat (e.g., partially hydrogenated vegetable oil) that encapsulates the sugar (sucrose). The oil or fat encapsulation material preferably possesses a melt point higher than the typical surface temperature of the frozen French fried potato pieces at the time the encapsulated sugar is applied to the frozen potato pieces. This inhibits or prevents the encapsulation material from melting, thus inhibiting or preventing the sugar from becoming dissolved. In the case of partially hydrogenated vegetable oil as the encapsulation material, the melt point is between approximately 152° F. and 158° F.

A preferred size of sugar encapsulated within the encapsulation material is fine granulated sugar or very fine granulated sugar which are recognized as industry standards. Sugars of this type are manufactured by The Amalgamated Sugar Company LLC. It has been found that if excessively large sugar crystals are encapsulated within the encapsulation material, a sufficient surface area of the potato pieces may not be covered. In addition, it may be difficult to completely or fully encapsulate larger sugar crystals, thus presenting the possibility that the sugar may dissolve, partially or completely, when applied to the frozen French fried potato pieces. As an alternative to granulated sugar as described above, or possibly in addition to such granulated sugar, raw sugar, brown sugar or powdered sugar could be employed as the material encapsulated in the encapsulation material.

One possible way of applying the encapsulated sugar to the frozen French fried potato pieces is through use of a rotating drum or tumbler. Such a rotating drum or tumbler can be similar to that used to apply seasonings to potato chips and are other similar products. The frozen French fried potato pieces can be placed in the rotating drum or tumbler, with the encapsulated sugar added to the rotating drum or tumbler as the frozen French fried potato pieces are being tumbled.

To help ensure that the encapsulated sugar is adequately and sufficiently applied (adhered) to the outer surface of the French fried frozen potato pieces, it has been found preferable to perform suitable processing that imparts a degree of tackiness to the frozen potato pieces. That is, the outer surface of the frozen French fried potato pieces should be of such a character that the encapsulated sugar is readily attached to the frozen French fried potato pieces. This can be accomplished in several ways.

One way involves frying the potato pieces in oil having a melt point which possesses characteristics readily allowing the topical addition (e.g., encapsulated sugar) to become attached to the frozen potato pieces when the encapsulated sugar is applied to the frozen potato pieces. In this regard, winterized soybean oil is a suitable oil for use in frying (parfrying) the potato pieces prior to application of the topical addition (e.g., encapsulated sugar). This type of oil possesses a melt point equal to or less than about 20° F., which is significantly lower than the melt point of, for example, hydrogenated soybean oil which is oftentimes used to fry (parfry) the potato pieces. The melt point of hydrogenated soybean oil used to fry (parfry) the potato pieces is approximately 90° F.–100° F.

Other oils having an appropriate melt point, preferably equal to or less than 30° F. and more preferably equal to or less than 20° F., could also be used. Examples include salad oil, which is less refined than winterized soybean oil but possesses a similar melt point, corn oil, cottonseed oil, peanut oil and palm oil With potato pieces fried (parfried) in winterized soybean oil or other suitable oils having a melt point equal to or less than 30° F. and preferably equal to or less than 20° F., when the fried potato pieces are subsequently frozen and then subjected to further processing to apply the topical addition (e.g., encapsulated sugar), the oil possesses characteristics allowing the topical addition to become attached or applied to the outer surface of the frozen potato pieces. That is, even though the potato pieces are frozen after being fried in the oil, liquid oil is still present on the surface of the potato pieces when the topical addition is applied. This which facilitates application or adherence of the topical addition to the frozen French fried potato pieces. Thus, by suitably selecting an oil having a melt point equal to or less than 30° F. and preferably equal to or less than 20° F., the oil will possess characteristics allowing the topical addition to become more easily applied or attached to the potato pieces while the potato pieces are moving in the rotating drum or tumbler during application of the topical addition.

Another way which has been found more preferable for imparting similar characteristics to the frozen potato pieces involves applying a tacking agent to the potato pieces after the potato pieces are frozen. This tacking agent can take various forms, including winterized soybean oil such as mentioned above, and the other oils also mentioned above. Starches or other hydrocolloids might also be usable in this regard. This tacking agent can be applied at the same time the encapsulated sugar is applied. For example, as mentioned above, a seasoning drum or tumbler can be used to apply the topical addition (e.g., encapsulated sugar) to the frozen potato pieces. After placing the frozen potato pieces in such a drum or tumbler, the appropriate tacking agent (e.g., winterized soybean oil) is sprayed from inside the rotating drum or tumbler by way of spray heads, thus causing the tacking agent to be applied to the potato pieces which are moving in the drum. While the tacking agent is being sprayed inside the drum or tumbler, the encapsulated sugar or other topical addition is also introduced into the drum or tumbler. The tacking agent is thus applied to the frozen potato pieces and the encapsulated sugar or other topical addition is held to the potato pieces by way of the tacking agent.

It is preferable that the weight percent ratio of encapsulated material (e.g., sugar) to encapsulation material (e.g., partially hydrogenated vegetable oil) be such that the weight percent of encapsulated material (e.g., sugar) is within the range of 60 wt. %–95 wt. % while the weight percent ratio of encapsulation material (e.g., partially hydrogenated vegetable oil) is within the range 40 wt. %–5 wt. %. In the case of sugar as the encapsulated material and partially hydrogenated vegetable oil as the encapsulation material, a particularly preferred ratio is 75 wt. % sugar/25 wt. % partially hydrogenated vegetable oil. If the weight percent of encapsulation material is excessively small, the encapsulated material (e.g., sugar) may not be completely surrounded or covered by the encapsulated material. The encapsulated material may thus be exposed and susceptible of becoming dissolved when applied to the frozen French fried potato pieces. Also, if the weight percent of encapsulation material is excessively large, the coating or encapsulation material may not sufficiently tack or adhere to the frozen potato pieces.

After the encapsulated sugar or other topical addition is applied to the frozen French fried potato pieces, the resulting frozen formed French fried potato product is packaged and stored. The consumer can then reheat or reconstitute the frozen formed French fried potato products by baking (e.g., in an oven or toaster oven), deep fat frying, or microwave cooking.

In the final frozen formed French fried potato product, the encapsulated sugar on the frozen potato pieces represents approximately 1 wt. %–15 wt. %, more preferably 6 wt. %–10 wt. %, of the total French fried potato product. It has been found that this provides a desired degree of sweetness to the French fried potato product. Of course, with other topical additions, this weight percentage may vary.

It also possible to use natural and/or artificial sweeteners other than sugar as the encapsulated material. In addition, high intensity sweeteners (e.g., sucralose) could be used as the encapsulated material.

Figure 2:
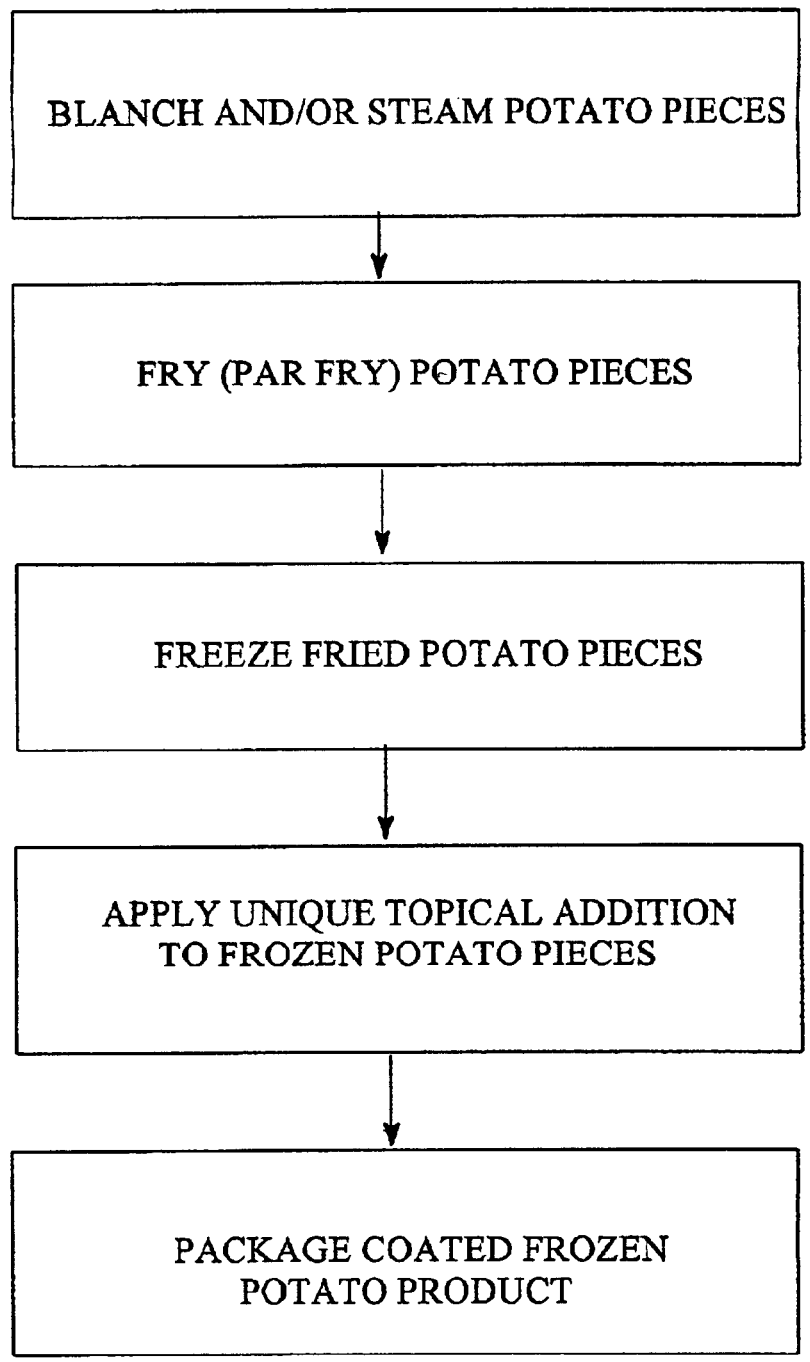
FIG. 2 is a process flow diagram illustrating another process in accordance with the present invention for producing frozen French fried potato products having unique topical additions.

Frozen French fried potato products having unique topical additions such as sugar can also be produced using a different method or process such as illustrated in FIG. 2. Here, rather than producing formed potato products from a potato mash, the potato products are produced from raw potato pieces. Once again, except for the application of topical additions as described below, this process is similar to known processes used in the industry.

In accordance with this method, raw potato pieces are prepared in a conventional manner by optionally peeling and cutting potatoes into desired shapes. The potato pieces are then partially cooked in a water bath and/or steam chamber to swell and at least partially gelatinize the potato starch over the exposed surfaces of the pieces. The potato pieces can be at least partially cooked for 2 min.–20 min at a temperature between 160° F.–195° F. Afterwards, the potato pieces can be optionally dried for 1 min.–20 min at a temperature between ambient and 200° F. The potato pieces are then fried (parfried). The potato pieces can be par-fried in food grade oil at about 270° F.–395° F., preferably at about 330° F.–395° F., and more preferably at 345° F.–395° F. for a period of 30–180 seconds. It is to be understood that the par-frying time varies based on the size and shape of the potato pieces as well as the final color desired. By way of example, for crinkle cut potato pieces, par-fried times of about 40–180 seconds are utilized. The fried potato pieces are then cooled and frozen.

After freezing the potato pieces, topical additions such as encapsulated sugar can be applied to the frozen French fried potato pieces. The description set forth above regarding the encapsulated sugar and the way it is applied to the frozen potato pieces, including imparting tackiness to the French fried potato pieces, is equally applicable here. After the encapsulated sugar or other topical coating is applied to the frozen French fried potato pieces as described above, the resulting frozen French fried potato product is packaged and stored. The consumer can then reheat or reconstitute the frozen formed French fried potato products by baking (e.g., in an oven or toaster oven), deep fat frying, or microwave cooking.

It is also to be understood that in connection with both the process shown in FIG. 1 and the process shown in FIG. 2, the formed potato pieces (FIG. 1 process) and the non-frozen potato pieces (FIG. 2) can be immersed in a batter solution prior to final frying. These batter solutions are known in the industry and are typically employed so that the potato product is better able to maintain its crispness characteristics, upon reheating or reconstituting by the consumer, for a longer period of time than might otherwise be the case. These batter solutions are starch based or flour based batter solutions.

The description set forth above describes the use of encapsulated sugar as a topical addition to frozen French fried potato pieces. However, it is to be understood that other types of topical additions can be applied to frozen French fried potato pieces to obtain a desired taste in the final product. Aside from salt, it is envisioned that a wide variety of water soluble flavor ingredients can be applied to frozen French fried potato products to provide a product having unique taste characteristics. By encapsulating the water soluble flavor ingredient(s) (other than salt) in an encapsulation material or coating as described above, the ingredient(s) is inhibited from becoming dissolved, thus allowing the desired taste characteristics to remain on the French fried potato product until consumed by the consumer. The additional water soluble ingredients, other than salt, can include a variety of different seasonings, spices and flavored bits. Examples of other water soluble ingredients that can be encapsulated and then applied as a topical addition to the frozen potato pieces include cinnamon, nutmeg, anise, ginger, fruit flavor chips and vinegar (dry). In addition, colored bits or decorative pieces can be encapsulated in the manner described above and then applied to the frozen potato pieces to provide a uniquely attractive frozen French fried potato product.

It is also possible to utilize encapsulated sugar and other topical additions as described above in combination with frozen French fried potato products having unique color characteristics and/or unique flavor characteristics. A U.S. patent application filed on even date herewith, entitled "Colored and/or Flavored Frozen French Fried Potato Product" (attorney docket no: 011525-304) describes frozen French fried potato products having color and/or flavor characteristics achieved through the addition of suitable color and/or flavor additives. A frozen French fried potato product having topical additions as described here as well as color and/or flavor characteristics as described in the aforementioned copending application, the entire disclosure of which is incorporated herein by reference, would provide an even more unique frozen French fried potato product.

The principles, preferred embodiments and production processes of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A method for preparing a potato product comprising:
producing potato pieces having a desired shape from potatoes;
frying the potato pieces;
freezing the potato pieces;
applying an encapsulated topical addition to the frozen potato pieces, the encapsulated topical addition comprising a water soluble ingredient other than salt encapsulated in an encapsulation material; and
applying an oil to the potato pieces after freezing the potato pieces to facilitate attachment of the encapsulated topical addition to the frozen potato pieces.

2. The method of claim 1, wherein the potato pieces are produced by cutting potatoes into potato pieces and at least partially cooking the potato pieces in a water bath or a steam chamber to swell and partially gelatinize potato starch in the potato pieces.

3. The method of claim 1, wherein the potato pieces are produced by at least partially cooking potato parts, producing a potato mash from the at least partially cooked potato parts, and then forming the potato mash into the potato pieces.

4. The method of claim 1, wherein the potato pieces are fried in an oil having a melt point equal to or less than 30° F., the oil facilitating attachment of the encapsulated topical addition of the frozen potato pieces.

5. A method for preparing a frozen French fried potato product comprising:
producing potato pieces having a desired shape from potatoes;
frying the potato pieces;
freezing the potato pieces;
applying granulated sugar to an outside surface of the frozen potato pieces to impart sweet taste characteristics to the French fried potato product upon consumption; and
packaging the sugar coated frozen potato pieces.

6. The method of claim 5, wherein the potato pieces are produced by cutting potatoes into potato pieces and at least partially cooking the potato pieces in a water bath or a steam chamber to swell and partially gelatinize potato starch in the potato pieces.

7. The method of claim 5, wherein the potato pieces are produced by at least partially cooking potato parts, producing a potato mash from the at least partially cooked potato parts, and then forming the potato mash into the potato pieces.

8. The method of claim 5, wherein the potato pieces are fried in an oil having a melt point equal to or less than 30° F., the oil facilitating attachment of the sugar to the frozen potato pieces.

9. The method of claim 5, including applying an oil to the potato pieces after freezing the potato pieces to facilitate attachment of the sugar to the frozen potato pieces.

10. The method of claim 5, wherein the sugar is encapsulated in an encapsulation material.

11. A method for preparing a frozen French fried potato product comprising:
producing potato pieces having a desired shape from potatoes;
frying the potato pieces;
freezing the potato pieces;
applying a granulated sugar coating to an outside surface of the frozen pieces; and then
packaging the sugar coated frozen potato pieces.

12. The method of claim 11, wherein the potato pieces are produced by cutting the potatoes into the potato pieces and at least partially cooking the potato pieces in a water bath or a steam chamber to swell and partially gelatinize potato starch in the potato pieces.

13. The method of claim 11, wherein the potato pieces are produced by at least partially cooking potato parts, producing a potato mash from the at least partially cooked potato parts, and then forming the potato mash into the potato pieces.

14. The method of claim 11, wherein the frying of the potato pieces involves frying the potato pieces in an oil having a melt point equal to or less than 30° F. the oil facilitating attachment of the sugar to the frozen potato pieces.

* * * * *